(12) United States Patent
Conner et al.

(10) Patent No.: US 6,939,110 B2
(45) Date of Patent: Sep. 6, 2005

(54) CONTROL SYSTEM FOR I.C. ENGINE DRIVEN BLOWER

(75) Inventors: Larry D. Conner, Maple Grove, MN (US); Donald S. Foreman, Fridley, MN (US)

(73) Assignee: Clarke Engineering Technologies, Inc., Roselle, IL (US)

( * ) Notice: Subject to any disclaimer, the term of this patent is extended or adjusted under 35 U.S.C. 154(b) by 0 days.

(21) Appl. No.: 10/288,956

(22) Filed: Nov. 6, 2002

(65) Prior Publication Data

US 2004/0086389 A1 May 6, 2004

(51) Int. Cl.[7] .......................... F04B 49/00; F04B 19/24; F04B 17/00
(52) U.S. Cl. ............... 417/34; 417/53; 417/18; 417/42; 417/364
(58) Field of Search ................ 417/53, 9, 18, 417/22, 20, 34, 42, 43, 364, 423.6, 423.1

(56) References Cited

U.S. PATENT DOCUMENTS

| | | | |
|---|---|---|---|
| 3,672,163 A | | 6/1972 | White |
| 3,786,869 A | * | 1/1974 | McLoughlin ............... 169/24 |
| 3,864,059 A | * | 2/1975 | Smith ........................ 417/20 |
| 4,182,491 A | * | 1/1980 | Parke et al. ................ 239/11 |
| 4,275,691 A | | 6/1981 | Wolff et al. |
| 4,367,804 A | | 1/1983 | Sakakibara |
| 4,534,707 A | * | 8/1985 | Mitchell ..................... 417/34 |
| 5,131,367 A | * | 7/1992 | Aoki et al. ............. 123/406.62 |
| 5,174,723 A | * | 12/1992 | Groger et al. ............... 417/26 |
| 5,197,860 A | * | 3/1993 | Nishida et al. .............. 417/34 |
| 5,224,836 A | * | 7/1993 | Gunn et al. ................. 417/14 |
| 5,248,448 A | * | 9/1993 | Waldron et al. .............. 516/6 |
| 5,468,126 A | * | 11/1995 | Lukich ....................... 417/53 |
| 5,615,655 A | | 4/1997 | Shimizu |
| 5,771,861 A | | 6/1998 | Musser et al. |
| 5,848,583 A | | 12/1998 | Smith et al. |
| 5,950,598 A | | 9/1999 | Wenzlawski et al. |
| 6,047,682 A | | 4/2000 | Fujino et al. |
| 6,088,647 A | | 7/2000 | Hemberger et al. |
| 6,112,721 A | | 9/2000 | Kouketsu et al. |
| 6,142,121 A | | 11/2000 | Nishimura et al. |
| 6,148,601 A | | 11/2000 | Jones et al. |
| 6,179,220 B1 | | 1/2001 | Kolkman et al. |
| 6,236,931 B1 | | 5/2001 | Poggio et al. |
| 6,354,274 B1 | | 3/2002 | Shima et al. |
| 6,363,914 B1 | | 4/2002 | Tanabe et al. |

\* cited by examiner

*Primary Examiner*—Justine R. Yu
*Assistant Examiner*—Timothy P. Solak
(74) *Attorney, Agent, or Firm*—Cook, Alex, McFarron, Manzo, Cummings & Mehler, Ltd.

(57) ABSTRACT

A system for maintaining constant pressure, such as at a mosquito fogging nozzle, by electronically controlling the speed of an engine that is coupled to a blower. A pressure sensor measures the pressure provided by the blower and provides a pressure signal to the electronic engine controller. The engine controller is of the proportional-integral (PI) type and utilizes pulse-width modulation (PWM) techniques to control an electromechanical actuator attached to the throttle of the engine to vary the engine speed. Constant pressure is maintained despite changes in the ambient temperature, humidity and barometric pressure. A safety circuit prevents engine over-speed if the pressure signal is lost. An over-speed circuit monitors and controls the engine speed at higher RPMs.

23 Claims, 5 Drawing Sheets

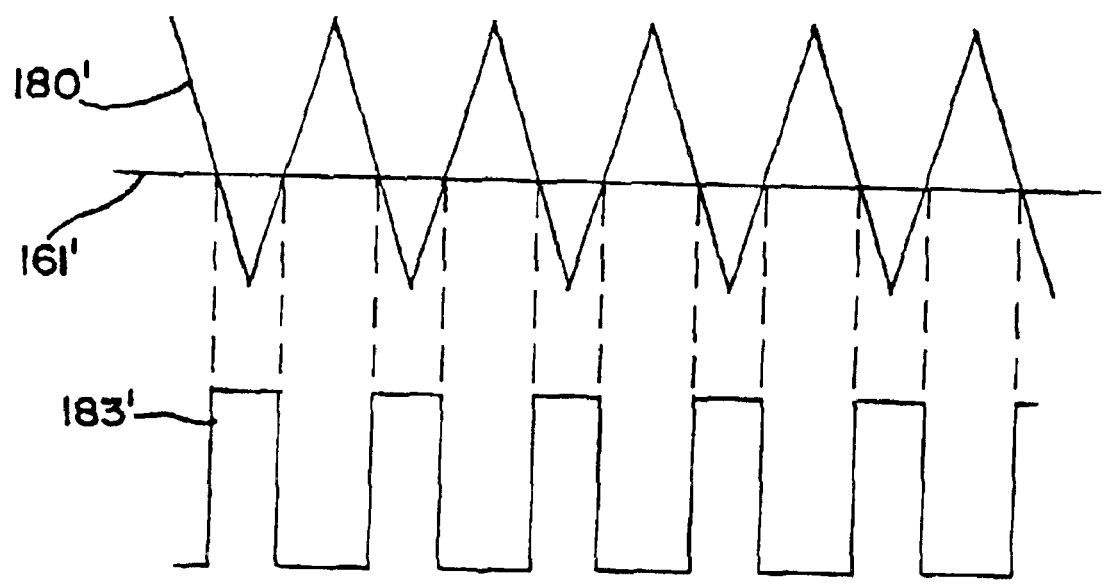

CONTROL SYSTEM FOR I.C. ENGINE DRIVEN BLOWER

BACKGROUND OF THE INVENTION

This invention relates in general to controlling pressure with an electronic engine controller. More particularly, the present invention relates to a system and methods for precisely controlling the pressure generated by a blower coupled to an engine by electronically controlling the engine speed.

Control of engine revolutions per minute (RPM) by mechanical means is well known. One such embodiment is by means of controlling the throttle of the engine with adjustable spring tension. For example, a centrifugal device may be mechanically coupled to a moving component of the engine to provide a representation of the RPM of the engine. When centrifugal forces in the centrifugal device are in balance with the spring tension, the throttle remains fixed. However, when the centrifugal forces and the spring tension are not in balance, the throttle is either opened or closed to achieve balance.

This throttle arrangement functions well for some applications. However, where the engine controller is used to control liquid or pressure developed by a blower coupled to the engine at a nozzle, the nozzle pressure is not usually directly related to engine RPM. That is, constant engine RPM will not necessarily result in constant gaseous or liquid pressure. In addition, nozzle pressure is subject to a variety of variables including temperature, humidity and barometric pressure. Nozzle pressure may vary by as much as 20 percent due to these variables when the engine RPM is kept constant.

There is therefore a need for an improved engine controller that can effectively control and maintain nozzle pressure rather than engine RPM.

SUMMARY OF THE INVENTION

The engine controller of the present invention achieves constant nozzle pressure by varying the speed of the engine that is coupled to a blower. A pressure sensor measures the pressure provided by the blower near the nozzle and provides a pressure signal to the electronic engine control. The engine control is of the proportional-integral (PI) type and utilizes pulse-width modulation (PWM) techniques to control an electromechanical actuator attached to the throttle of the engine to vary the engine speed. The operator may manually select the desired pressure.

An additional feature of the present invention includes a safety circuit in the engine controller to prevent engine over-speed in the event of a loss of the pressure sensor signal. An over-speed safety circuit is responsive to a signal from a magneto of the engine to monitor and to control engine speed at higher RPMs. This safety circuit limits top engine speed to a safe value in the event of loss of pressure signal.

Related methods of controlling constant pressure by electronic control of a variable speed engine form another aspect of the present invention. These methods include sensing the pressure with a pressure sensor disposed downstream from the blower on the high pressure side, generating a pressure signal related to the pressure, providing the pressure signal to the engine controller, developing a control signal in the engine controller based upon the pressure signal, supplying the control signal to a throttle control mechanism and varying the position of the throttle in accordance with the control signal to maintain constant pressure at the pressure sensor.

A general object of the present invention is to electronically control an engine to maintain a constant gaseous or liquid pressure developed by a blower coupled to the engine.

Another object of the present invention is to utilize pulse-width modulation in an electronic engine controller to more efficiently control an electromechanical actuator attached to the throttle of the engine to develop constant nozzle pressure, including more efficient and cooler operating electronic drive circuitry.

A further object of the present invention is to provide a means of controlling engine speed at higher engine RPMs by utilizing a signal from the magneto associated with the ignition system of the engine.

BRIEF DESCRIPTION OF THE DRAWINGS

The features of the present invention which are believed to be novel are set forth with particularity in the appended claims. The invention, together with the further objects and advantages thereof, may best be understood by reference to the following description taken in conjunction with the accompanying drawings, in the several figures in which like reference numerals identify like elements, and in which:

FIGS. 4A, 4B and 4C are electronic circuit schematics of the electronic engine controller.

FIG. 5 is a diagram of typical electronic signals at the pulse-width modulator portion of the electronic engine controller.

DETAILED DESCRIPTION OF THE INVENTION

Figure 1:
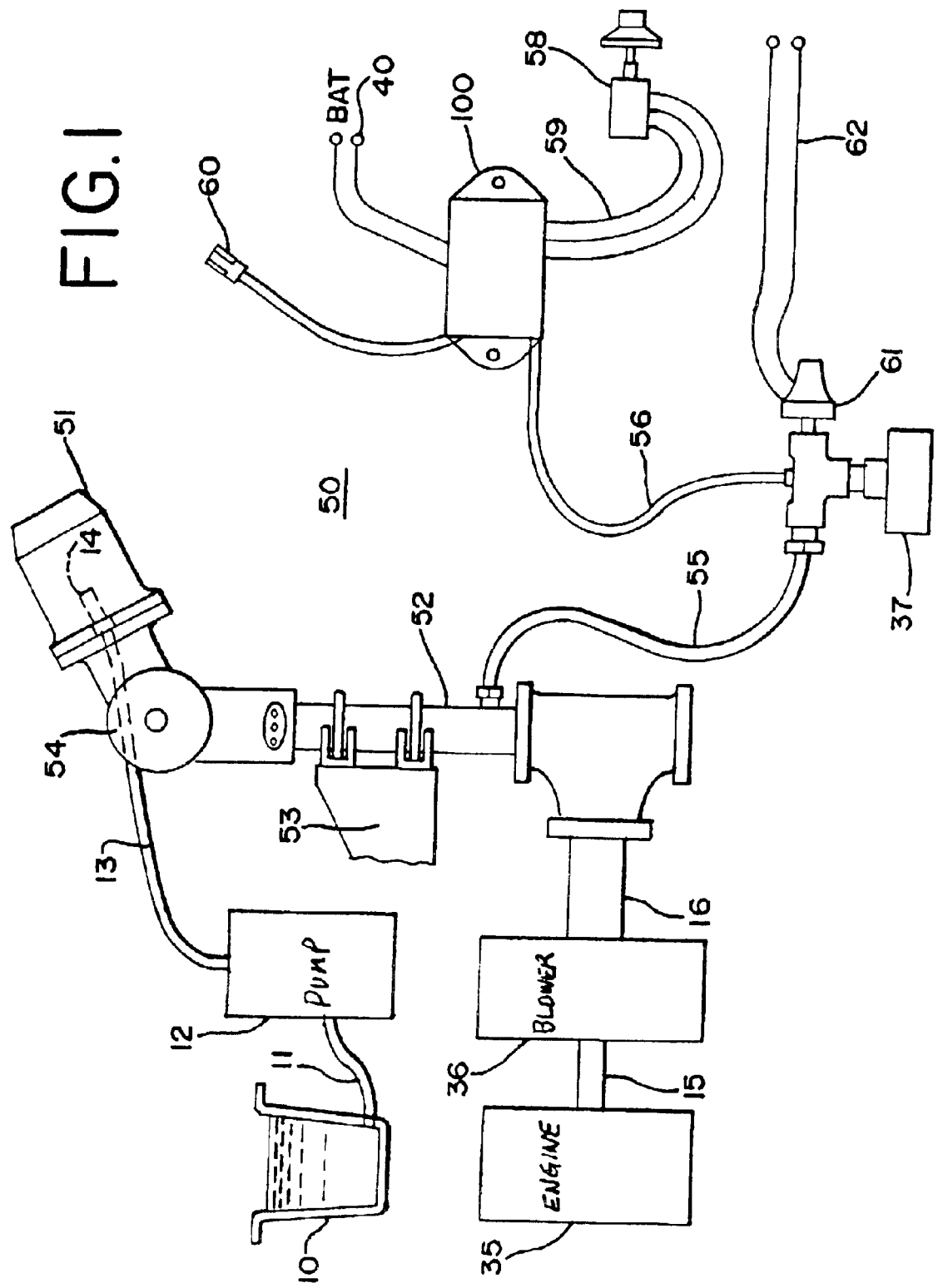
FIG. 1 is a partial elevational view of a mosquito fogger that utilizes an electronic engine controller in accordance with the present invention.
Figure 2:
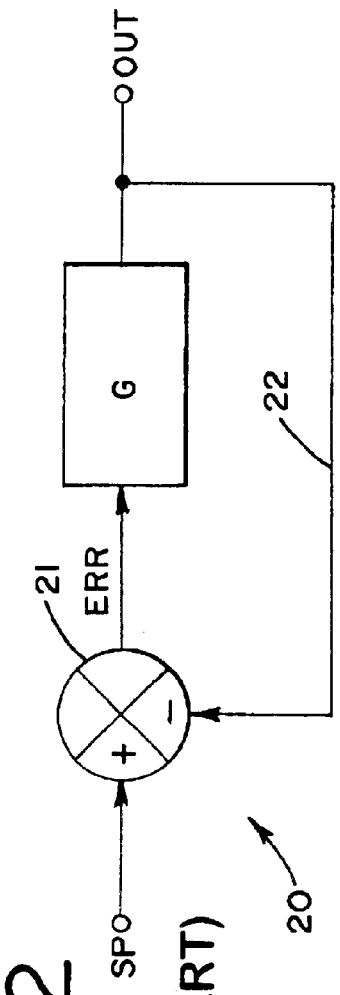
FIG. 2 is a block diagram of a general feedback control system.
Figure 3:
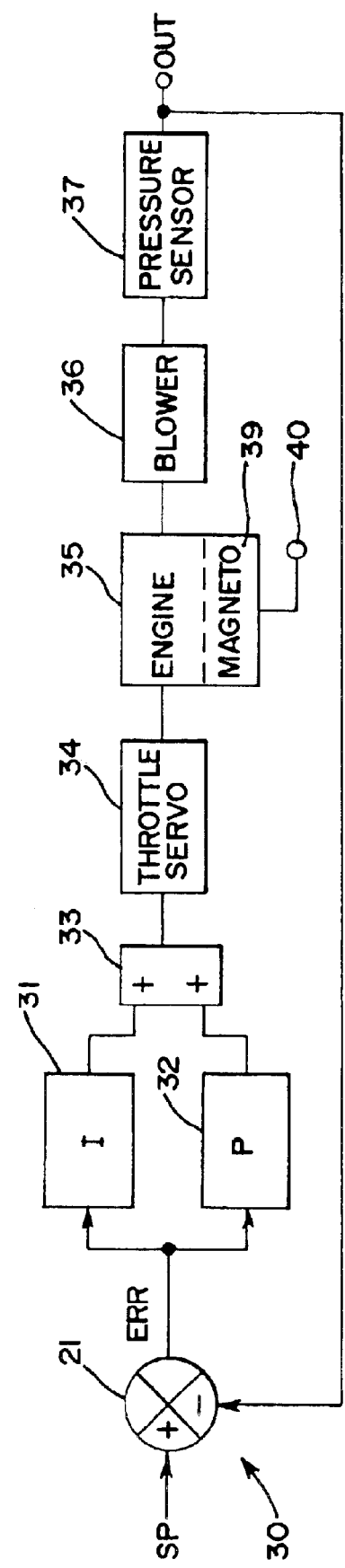
FIG. 3 is block diagram of the proportional-integral control system utilized in the present invention.

Referring to the Figures, and particularly to FIG. 1, some of the essential elements of a mosquito fogger system, generally designated 50, are illustrated. The fogger system 50 may be described as a high volume, low pressure system. Such systems are also frequently referred to as ultra-low volume (ULV), which means that the delivered dosage, such as of an insect chemical, is of very low volume as compared to the air volume. The air volume may typically be about 300 cubic feet per minute (CFM).

The insect chemical is contained within a tank 10. A chemical pump 12 receives the chemical by tubing 11 and supplies the chemical via tubing 13 to an injector 14 disposed at the base of the nozzle 51. Chemical pump 12 may operate from a supply voltage generated by the engine 35, or may be mechanically driven by the engine 35. Engine 35 also drives a blower 36, such as by a mechanical coupling or shaft 15. Blower 36 supplies pressurized air via a pipe 16 to the lower end of the mast 52.

The pressure at the nozzle 51 also affects the droplet size of the chemical that is mixed with, and suspended in, the air. Chemical manufacturers specify an optimum droplet size for best suspension of the chemical droplets in the air. Thus, the droplet size needs to be closely regulated for best results. For example, eighty percent of the droplets may be less than 20 microns. Deviations in pressure at nozzle 51 can adversely affect the droplet size. It is thus important that the pressure at the nozzle 51 be closely regulated despite changes in ambient temperature, humidity, atmospheric pressure or the like. Of course, these conditions usually gradually change during the course of any day. The system of the present invention automatically compensates for these gradual changes, thereby requiring no change in the pressure setting.

A spray nozzle 51 may be mounted on top of a mast 52, which may be secured by a brace 53. In this embodiment, nozzle 51 is pivotally attached to mast 52 by a swivel 54 so that the direction of the spray emanating from nozzle 51 may be manually adjusted for best results. Best fogging results are generally attained when the pressure in the nozzle 51 is accurately controlled. For example, a pressure in the range of about 5 to 7 PSIG may be optimum to achieve the most effective droplet size for the mosquito fog developed by the fogger system 50. However, the actual pressure utilized may depend upon the manufacturer's recommendations for the selected chemical.

The pressure is measured by a pressure sensor 37 that is in gaseous communication with mast 52 via tubing 55. Pressure sensor 37 develops an electronic signal representative of the pressure in mast 52. Conductors 56 provide this pressure signal to an engine controller module 100. Engine controller module 100 also receives electrical power from a battery at terminal BAT, and a signal from a magneto of the ignition system of the engine at a terminal 40. A potentiometer 58 is manually adjustable by a user to set the engine speed by varying the input signal to the engine controller module 100 via one or more conductors 59. The engine controller module 100 provides an output signal at a connector 60 that attaches to a throttle actuator to adjust and control the throttle angle at the engine.

Near pressure sensor 37, a low-pressure switch 61 may be provided to cutoff a pump that provides the formulation for the fog, especially at low pressures in mast 52. A pair of conductors 62 provides the cutoff signal from low-pressure switch 61.

Illustrated in FIG. 2 is a general feedback control system, generally designated 20. An input signal SP is a setpoint, which is typically a setting selected by the operator of the system, such as the position of the control knob on potentiometer 58 in FIG. 1. The output signal OUT of the feedback control system is routed back to an adder/subtractor 21 by a line 22. Because the output signal is subtracted, this arrangement is known in the art as a negative feedback system.

The relationships between the signals in FIG. 1 can be expressed as: (1) OUT=G×ERR and (2) ERR=SP−OUT. Substituting SP−OUT for ERR from equation 2 into equation 1 and solving for the output signal OUT yields:

$$\mathrm{OUT} = \frac{G}{G+1} SP$$

For larger values of gain G, the output signal OUT approximates or approaches the input signal SP. However, it is known in the art that higher values of gain in a negative feedback system can lead to instability of the system due to phase shifts at higher frequencies. This occurs because as the phase shifts approach 180°, the intended negative feedback becomes positive feedback. Thus, for a value of gain G exceeding one, the system may become unstable, such as by uncontrolled oscillation. Thus, it is desirable to select a value of gain which achieves the desired negative feedback, but which becomes less than one at higher frequencies.

Turning now to FIG. 3, the preferred negative feedback system, generally designated 30, of the present invention is illustrated. It will be appreciated that several individual blocks have been substituted for the gain block G in FIG. 2. The error signal ERR is now input to both an integral gain block 31 and to a proportional gain block 32. The output signals of blocks 31 and 32 are combined at combiner 33. Together, blocks 31–33 correspond to a proportional-integral (PI) electronic engine controller. The output signal from combiner 33 is used to drive a throttle actuator 34 to control the throttle of engine 35. Throttle actuator 34 may be any electromechanical actuator suitable for moving the throttle of engine 35, including servomechanisms. Engine 35 has an ignition system of the magneto type 39 that provides an output signal at a terminal 40. The engine controller as described in greater detail below utilizes this magneto signal at terminal 40. Engine 35, in turn, is coupled to and drives a blower 36. A pressure sensor 37 measures the pressure created by blower 36 and provides the feedback signal to the adder/subtractor 21.

The gain G in FIG. 2 is the product of the engine controller 31–33 (error signal input to voltage output), the throttle actuator 34 (voltage input to throttle angle adjustment), the engine 35 (throttle angle adjustment to RPM), the blower 36 (RPM to PSI) and the pressure sensor 37 (PSI to feedback signal). Each of these elements has some lag or phase shift. Additionally, the gain for any element, such as blower 36 may not be constant, especially with changes in the ambient temperature. Thus, the gain must be set high enough to accommodate such changes.

Since the engine 35 and the blower 36 are in the gain loop and since the system senses pressure rather than engine RPM, the controller will cause the engine speed to vary as conditions affecting engine efficiency and blower efficiency change. Thus, the system will hold the blower pressure constant at the user selected setpoint. Pressure will typically remain constant within one percent despite changes in blower and/or engine efficiency.

The electronic circuitry for the engine controller is illustrated in the schematics of FIGS. 4A, 4B and 4C. The engine controller is generally designated 100 in these figures. The circuitry illustrated in FIG. 4A is the power supply, generally designated 101, for the engine controller 100. Power supply 101 has an input battery terminal BAT and an input ground terminal GND.

The input battery voltage across terminals BAT and GND is nominally +12 volts DC, but may vary from about +9 to +18 volts. A diode 102 and an over-voltage device 104 protect the power supply from reverse polarity connection at the input terminals BAT and GND, and from input voltage transients. A capacitor 103 provides additional input filtering for noise and the like. Integrated circuit 105 is a low-dropout linear voltage regulator. A number of suitable integrated circuit voltage regulators exist for this application. The selected voltage regulator is commercially available part number LF2951CN, which is commercially available from National Semiconductor Corporation of Santa Clara, Calif. The output voltage Vcc of voltage regulator 105 is set at +8 volts DC by the resistive values of resistors 106 and 107. Capacitor 108 provides high frequency filtering of the output voltage Vcc and also provides stability for voltage regulator 105.

Integrated circuit 110 and its associated components, including capacitors 111–115, resistors 116 and 117 and diodes 118 and 119 operate as a charge pump to provide a low-current negative bias voltage Vee of about −7 volts DC for some circuitry components. IC 110 is the commonly available 555 timer, such as commercially available part number LMC555CN, also available from National Semiconductor. Capacitor 114 provides higher frequency filtering for the negative output voltage Vee.

Figures 4A, 4C:
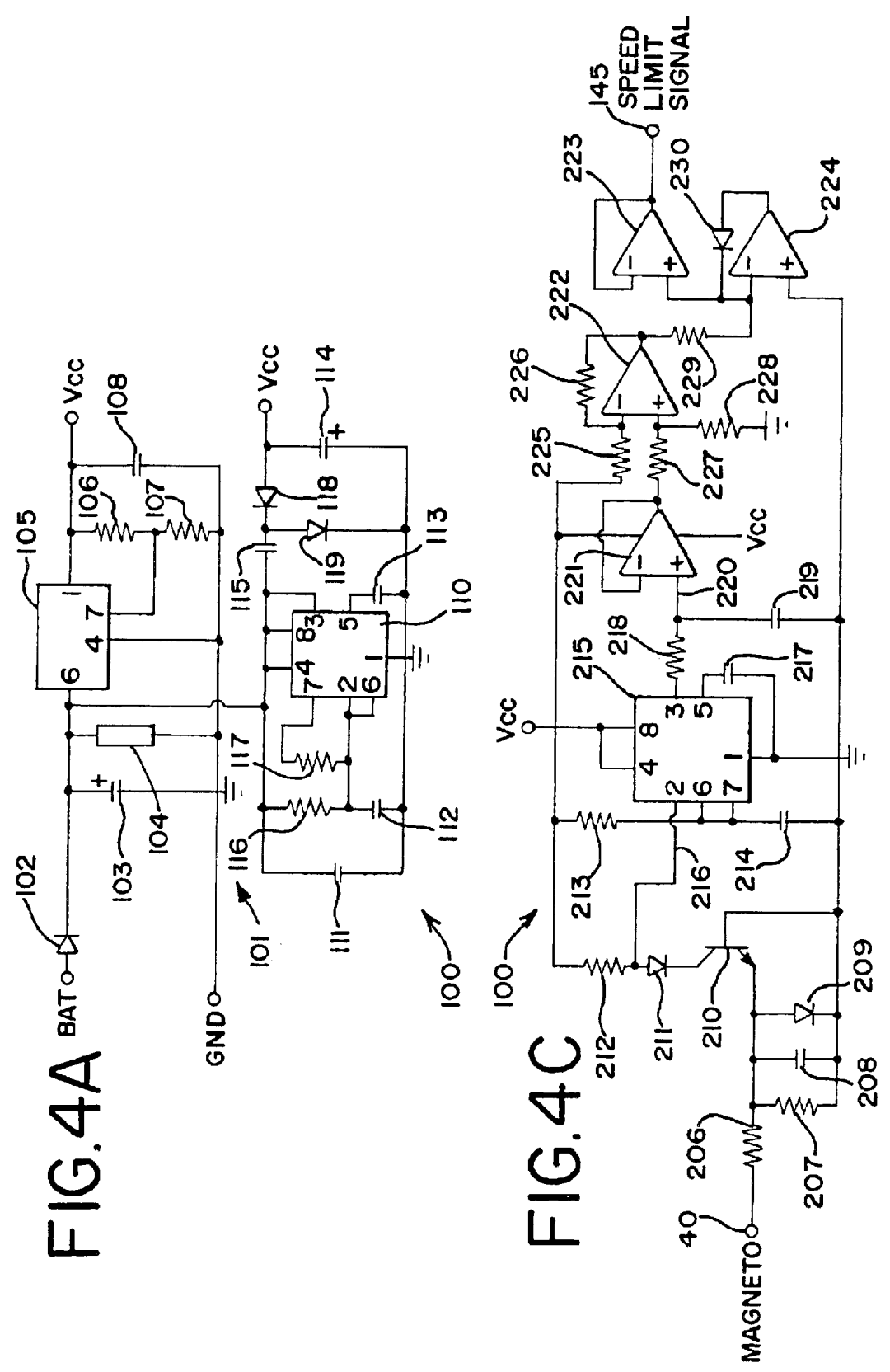
Figure 4B:
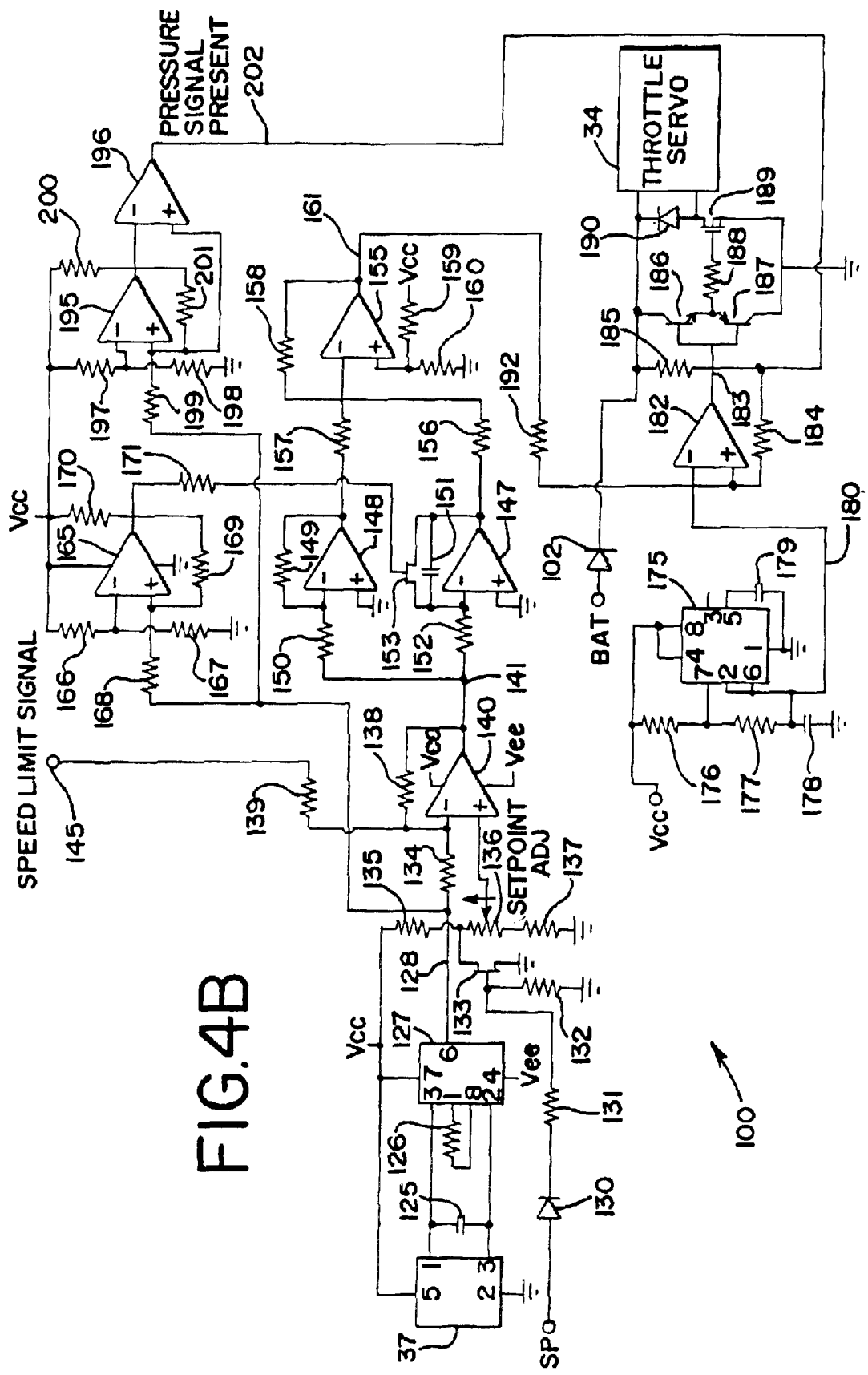

A substantial portion of the operational circuitry of the engine controller 100 is illustrated in FIG. 4B. Pressure sensor 37 is preferably a precision silicon bridge pressure sensor, such as part number SDX05D2 commercially available from the SenSym Corporation. Capacitor 125 provides low pass filtering of the output signal of pressure sensor 37 without generating excessive lag.

An instrumentation operational amplifier 127, such as part number INA121P, which is commercially available from Texas Instruments, Inc. of Dallas, Tex., receives the output signal from the pressure sensor 37. The gain of amplifier 127 is established by the resistive value of resistor 126 to a gain of about 75. As an example, the output signal of amplifier 127 on line 128 may be designed for about one volt per 1000 RPM of engine 35. In this example, when the output of amplifier 127 is at about 3.6 volts, the nominal engine speed may be about 3600 RPM. Preferably, an engine speed of 3600 RPM will nominally develop a pressure at nozzle 51 of about 6 PSIG.

The next stage of the circuitry in FIG. 4B includes an error amplifier 140. Amplifier 140 receives the pressure signal on line 128 through a resistor 134 at its inverting input. The pressure signal at the inverting input of error amplifier 140 is summed with a speed limit signal from terminal 145 through summing resistor 139. The voltage at speed limit terminal 145 is normally zero for engine speeds of up to about 3600 RPM, as will be described below in connection with the speed limit circuitry shown in FIG. 4C. Thus, amplifier 140 normally only receives the pressure signal from resistor 134 at its inverting input.

Resistors 135, 136 and 137 constitute a voltage divider between the positive bias voltage Vcc and ground. Resistor 136 is a variable resistor and may be used as the set point input control that the system operator may vary to set the desired system pressure, as sensed by pressure sensor 37. The wiper arm of resistor 137 is connected to the non-inverting input to amplifier 140, and establishes a voltage reference level for amplifier 140 to compare against the pressure signal imposed on its inverting input.

A remote control SP, consisting of diode 130, resistors 131 and 132 and FET transistor 133, enables or disables the setpoint control as set at resistor 136. An operator switches the system to the operating mode or to the idle mode by placing a 0 or +12 Vdc DC voltage level on terminal SP. When terminal SP is at 0 volts, FET 133 is disabled and the setpoint adjustment of the system at resistor 136 is enabled. Engine 35 then operates at the speed corresponding to the setting of resistor 136.

However, when +12 volts is on terminal SP, FET 133 will be rendered conductive by the FET gate bias established by resistors 131 and 132. When FET 133 is conductive, it clamps the setpoint voltage at resistor 136 and at non-inverting input of amplifier 140 to near zero, which causes engine 35 to operate in an idle mode.

When no speed limit signal is present at terminal 145, the ratio of resistors 134 and 138 will set the gain of amplifier 140, as is known in the art. Amplifier 140 thus develops an error signal on its output line 141. This error signal is provided as an input signal to a pair of amplifiers 147 and 148. Amplifier 148 is a proportional amplifier, with the gain set by resistors 149 and 150. Amplifier 147 is an integrator, with a capacitor 151 connected from its output to its inverting input.

An FET transistor 153 connected across capacitor 151 provides for integrator reset. Transistor 151 also holds the integrator at reset when the pressure signal at pin 6 of integrated circuit 127 is below a minimum value. This prevents integrator amplifier 147 from accumulating an error signal, such as during prolonged engine start-up or from starting transients. Otherwise, any accumulated error associated with integrating amplifier 147 could cause engine controller overshoot until amplifier 147 has time to recover.

Amplifier 165 operates as a threshold detecting circuit to reset and hold the capacitor 151 associated with integrating amplifier 147 in a reset condition until the pressure signal present on output line 128 is above that associated with engine cranking speed. Resistors 166 and 167 establish a voltage reference at the inverting input of amplifier 165. The non-inverting input of amplifier 165 receives the pressure signal on line 128 through resistor 168. When the pressure signal is lower than the reference voltage, amplifier 165 keeps transistor 153 in conduction to reset capacitor 151. However, once the engine is started and begins operating, amplifier 165 renders transistor 153 non-conductive and integrating amplifier 147 becomes operational as an integrator.

Amplifier 148 constitutes the proportional channel and amplifier 147 constitutes the integral channel for engine controller 100. Both of amplifiers 147 and 148 receive input signals from the output of amplifier 140 at their respective inverting inputs. The outputs of amplifiers 147 and 148 are summed through resistors 156 and 157, respectively, at the inverting input of amplifier 155. Thus, amplifier 155 sums the signals from amplifiers 147 and 148 and again inverts these signals at its output on line 161. The signal on line 161 is the desired control voltage for the engine controller as a function of the error signal from the output of error amplifier 140 on line 141. The non-inverting input of amplifier 155 is set at a reference voltage, as determined by resistors 159 and 160.

An integrated circuit 175 with its associated components, including resistors 176 and 177 and capacitors 178 and 179, provides a sawtooth waveform on line 180. IC 175 is a CMOS 555 timer, such as part number LMC555CN noted above. This sawtooth waveform is shown as waveform 180' in FIG. 5. For example, this sawtooth waveform may vary between about 2.7 volts and 5.3 volts with a frequency of about 1000 Hz. Amplifier 182 compares the sawtooth waveform on its inverting input to the engine controller voltage from line 161 presented through resistor 192 to its non-inverting input. The engine controller voltage is shown as waveform 161' in FIG. 5. The result of this comparison is a pulse-width modulated (PWM) signal on output line 183 of amplifier 182. This PWM signal on line 183 is shown as waveform 183' in FIG. 5. The percent of duty cycle of the PWM signal on output line 183 is proportional to the level of the control voltage on line 161. That is, as the control voltage on line 161 rises above the level shown in FIG. 5, the output of amplifier 182 will be at a high level for a greater proportion of the time period of the sawtooth waveform on line 180.

The base-coupled transistors 186 and 187 provide buffering for the output of amplifier 182 to drive the gate of FET transistor 189, which presents an essentially capacitive load to transistors 186 and 187 through resistor 188. Transistor 189 controls, for example, a three-ampere throttle actuator 34, and a Schottky diode 190 snubs the inductive currents created when the current in the throttle actuator 34 is abruptly interrupted by periodic non-conduction of transistor 189. Transistor 189 provides fast on-off transitions of well under one microsecond. As a result, transistor 189 operates efficiently and with minimal or no required heat sinking. The result is smooth, continuous, high-efficiency control of current through the throttle actuator 34.

A pair of operational amplifiers 195 and 196 provides a safety function to prevent engine over-speed, including runaway, in the event of loss of pressure signal on line 128. For example, a loss of pressure signal may occur if a pressure line is severed or blocked, or if pressure sensor 37 fails. A voltage reference is established at the inverting input of amplifier 195 by voltage divider resistors 197 and 198. A resistor 199 presents the pressure signal on line 128 to the non-inverting input of amplifier 195. If a pressure signal is present, the voltage level at the non-inverting input of amplifier 195 will exceed the level at the inverting input and the output of amplifier 195 will be at a high level. This high level signal at the inverting input of amplifier 196 results in a low level on its output, which is also the pressure signal present line 202. The low level on pressure signal present line 202 permits the control voltage line 161 to bias the non-inverting input of amplifier 182 through the resistor divider defined by resistors 184 and 192.

However, if the pressure signal on line 128 is not present, amplifiers 195 and 196 will change the pressure signal present line 202 to a high level. This high level will change the bias on the non-inverting input to amplifier 182 to a higher lever than that of the sawtooth waveform at the inverting input of amplifier 182. Amplifier 182 will then cease its PWM drive of throttle actuator 34, and the engine will return to its idle state.

The circuitry in FIG. 4C is an independent over-speed safety circuit. A signal from the magneto of the ignition system for the engine is received at terminal 40. Transistor 210 and its associated circuitry condition the incoming signals to provide clean usable pulses from the noisy, high-voltage magneto signals. Resistors 206 and 207 in combination with capacitor 208 provide initial filtering of the input magneto signals. Diode 209 clips positive pulses. Transistor 210, with its base referenced to ground, is rendered conductive by negative pulses. The collector circuit of transistor 210, including diode 211 and resistor 212, provide conditioned pulses on an input line 216 to a monostable multivibrator 215. Multivibrator 215 is a CMOS 555 timer, such as commercially available part number LMC555CN noted above. Regardless of the magnitude and duration of the magneto pulses, each pulse yields a pulse of known and constant duration at resistor 218.

As the speed of the engine increases, the number of pulses from monostable multivibrator 215 also increases. Resistor 218 and capacitor 219 act as a low pass filter. The pulse width of multivibrator 215 and the values of resistor 218 and capacitor 219 are selected to produce about one volt per 1000 RPM on line 220. Comparators 221–224, in combination with resistors 225–229 and diode 230, modify the speed signal on line 220 so that the speed limit signal at terminal 145 is zero for all RPM values below about 4000 RPM. In the present design, 3600 RPM is considered to be the maximum normal RPM and 4000 RPM is considered to be the maximum safe speed for both the engine 35 and the blower 36. Above about 4000 RPM, the speed limit signal at terminal 145 rises by about one volt per 1000 RPM. This smooth transition in the speed limit signal is necessary for system stability. An abrupt transition could cause the system to become unstable or to hunt around a certain speed.

The output of the speed limit safety circuit at terminal 145 in FIG. 4C connects to terminal 145 in FIG. 4B. As previously described, this input is one of the summed inputs to error amplifier 140. When the speed limit signal becomes non-zero as the engine RPM surpasses 4000 RPM, the speed limit signal has controlling authority that is accumulated by the integrating amplifier 147 within a few seconds or less. Typically, this may happen when the setpoint for engine speed has accidentally been set too high. Thus, the speed limit signal maintains the engine speed at an acceptable level to satisfy the pressure safety circuit, but not high enough to meet the setpoint. Returning the setpoint to an appropriate level will enable the engine controller to return to normal operation.

Note that unlike the time response of the speed limit circuit, the pressure safety circuit immediately clamped the PWM drive circuit to the throttle actuator to idle upon the loss or near loss of pressure. The pressure safety circuit can operate spontaneously because the system gain is zero or near zero when the pressure is lost. Thus, there is no risk of system instability or hunting.

While particular embodiments of the invention have been shown and described, it will be obvious to those skilled in the art that changes and modifications may be made therein without departing from the invention in its broader aspects.

What is claimed is:

1. Apparatus for maintaining constant pressure in a spraying system, said apparatus comprising:
   a spraying nozzle,
   an engine with a throttle to vary the speed of the engine,
   a throttle control mechanism coupled to the throttle to vary the position of the throttle,
   a blower coupled to the engine to provide gaseous pressure to the spraying nozzle,
   a pressure sensor disposed near the spraying nozzle to measure the pressure developed by the blower and to generate a pressure signal related to the pressure, and
   an engine controller coupled to the throttle control mechanism, said engine controller receiving said pressure signal from the pressure sensor, said engine controller using the pressure signal to generate a control signal to the throttle control mechanism to control the position of the throttle, thereby varying engine speed to maintain the constant pressure at the pressure sensor near the nozzle wherein said engine controller is of the proportional-integral type with a proportional control channel and an integral control channel.

2. The apparatus as claimed in accordance with claim 1 wherein said engine controller is of the proportional-integral type with a proportional control channel and an integral control channel.

3. The apparatus as claimed in accordance with claim 1 wherein the throttle control mechanism is an electromechanical actuator.

4. The apparatus as claimed in accordance with claim 1 wherein said control signal from the engine controller is pulse-width modulated.

5. The apparatus as claimed in accordance with claim 1 further comprising:
   a loss of pressure signal detector to detect the loss of the pressure signal from the pressure sensor and to respond to the loss of the pressure signal to prevent excessive engine revolutions per minute.

6. The apparatus as claimed in accordance with claim 5 wherein the loss of pressure signal detector limits the engine speed to about a normal engine idle speed upon loss of the pressure signal.

7. The apparatus as claimed in accordance with claim 1, further comprising:

an over-speed detector to detect engine speeds above a predetermined engine speed and to control the speed of the engine upon exceeding the predetermined engine speed.

8. The apparatus as claimed in accordance with claim 7 wherein said over-speed detector receives an input engine speed signal from a magneto associated with the engine.

9. The apparatus as claimed in accordance with claim 1 wherein the spraying system sprays a liquid-gaseous mixture from the nozzle.

10. The apparatus as claimed in accordance with claim 9 wherein the liquid-gaseous mixture is air and a chemical in liquid form.

11. The apparatus as claimed in accordance with claim 10 where the volume of the liquid sprayed is a predetermined amount lower compared to the air volume.

12. The apparatus as claimed in accordance with claim 1 wherein the spraying system is a mosquito fogger.

13. The apparatus as claimed in accordance with claim 1 wherein the pressure at the nozzle is in a range of about 5 to 7 PSIG.

14. A method for maintaining constant pressure in a spraying system including a spraying nozzle, an engine with a throttle for varying the speed of the engine, a throttle control mechanism coupled to the throttle to vary the throttle position, a blower coupled to said engine to provide pressure, a pressure sensor disposed near the nozzle and an engine controller of the proportional-integral type with a proportional control channel and an integral control channel coupled to the throttle control mechanism, said method comprising:

sensing the pressure from the blower at the pressure sensor near the nozzle, generating an electrical pressure signal related to the sensed pressure, providing the pressure signal from the pressure sensor to the engine controller, developing a control signal in the engine controller based upon the pressure signal, supplying the control signal from the engine controller to the throttle control mechanism, and varying the position of the throttle in accordance with the control signal from the engine controller to maintain a constant pressure at the pressure sensor near the nozzle.

15. The method in accordance with claim 14 further comprising the step of:

providing a control signal from the engine controller to the throttle control mechanism which is pulse-width modulated.

16. The method as claimed in accordance with claim 14 further comprising the steps of:

detecting the loss of the pressure signal from the pressure sensor, and responding to the loss of the pressure signal to limit the engine speed.

17. The method as claimed in accordance with claim 14 further comprising the steps of:

detecting if the engine speed exceeds a predetermined engine speed, and controlling the speed of the engine above the predetermined engine speed.

18. An electronic engine controller for a spraying system to maintain constant pressure at a spray nozzle, said system including an engine with a throttle to vary the speed of the engine, a throttle control mechanism to vary the position of the throttle, a blower coupled to the engine to provide pressure and a pressure sensor disposed near the spray nozzle to measure the pressure and to generate a pressure signal related to pressure, said engine controller comprising:

means for receiving said pressure signal from the pressure sensor, means for generating a control signal related to said pressure signal, and means for supplying said control signal to said throttle control mechanism to maintain constant pressure at the pressure sensor near the spray nozzle.

19. The electronic engine controller claimed in accordance with claim 18 wherein said control signal is pulse-width modulated.

20. The electronic engine controller claimed in accordance with claim 18 further comprising:

a loss of pressure signal detector to detect the loss of the pressure signal from the pressure sensor and to respond to the loss of the pressure signal to prevent excessive engine revolutions per minute.

21. The electronic engine controller claimed in accordance with claim 20 wherein the loss of pressure signal detector limits the engine speed to about a normal engine idle speed upon loss of the pressure signal.

22. The electronic engine controller claimed in accordance with claim 18 further comprising:

an over-speed detector to detect engine speeds above a predetermined engine speed and to control the speed of the engine upon exceeding the predetermined engine speed.

23. The electronic engine controller claimed in accordance with claim 22 wherein said over-speed detector receives an input engine speed signal from a magneto associated with the engine.

* * * * *